Figure 2:
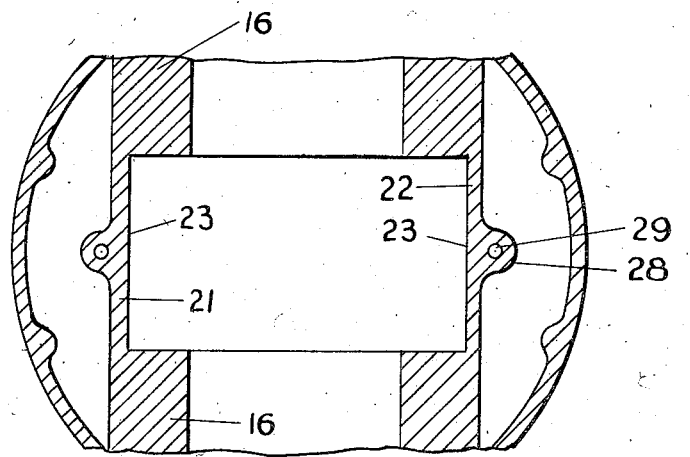

Jan. 7, 1958     F. C. TROMEL     2,818,842
PISTONS
Filed Aug. 30, 1954

FREDERIC C. TROMEL
INVENTOR

BY *Maurice W. Grady*
ATTORNEY

United States Patent Office 2,818,842
Patented Jan. 7, 1958

2,818,842

PISTONS

Frederic C. Tromel, Schenectady, N. Y., assignor to Alco Products, Incorporated, New York, N. Y., a corporation of New York Application August 30, 1954, Serial No. 452,789

6 Claims. (Cl. 123—41.38)

This invention relates to pistons for internal combustion engines and particularly to a structure to produce effective cooling of such a piston by oil from the engine lubricating system.

The principal object of the present invention is to provide a novel piston and connecting rod assembly which includes means for circulating oil from the lubricating oil system of the engine into a chamber in the piston and maintaining a predetermined quantity of such oil therein during operation so that a sloshing and cooling action is produced as the piston reciprocates.

Another object is to provide such an assembly wherein the cooling oil is contained in a chamber in the piston, the connecting rod itself serving as a sealing means for the chamber.

Still another object is to provide such an assembly in which the piston and connecting rod are so connected that the sloshing oil in the piston chamber is substantially sealed from escape except through passages particularly designed for that purpose.

Other and further objects of the present invention will be apparent from the following description, the accompanying drawing, and the appended claims.

Figure 1:
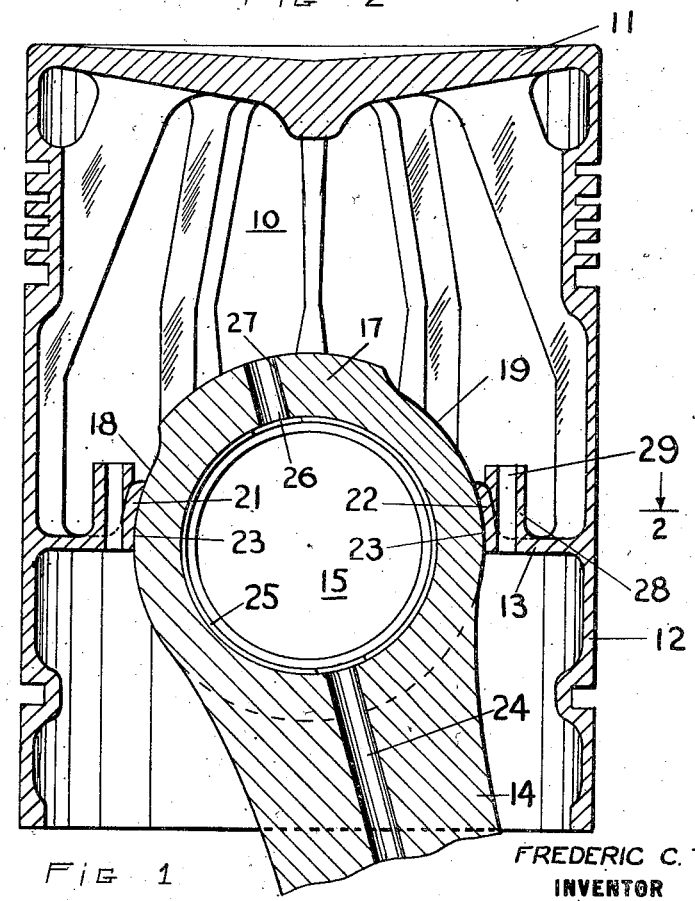

In the drawings,

Fig. 1 is an elevation in section of a piston and part of the connecting rod therefor; and Fig. 2 is a partial cross section taken on line 2—2 of Fig. 1 and omitting the connecting rod.

The present invention is an improvement over the type of piston shown in Patent No. 2,241,629 to W. E. Brill. In this patent, a moving sleeve and spring are used to seal oil in the cooling chamber. The disadvantage of such a construction is that the moving parts are subjected to high inertia forces with consequent high friction and wear.

Referring now to the drawings, the piston to which the invention is applied has a central chamber 10 in its upper portion defined in part by a head 11, a dependent skirt 12, and a transverse bottom partition 13. Connecting rod 14 is secured to the piston by a wrist pin 15 extending through opposed bosses 16 formed on the piston wall. Bosses 16 are joined to partition 13 to form a portion of a continuous bottom closure or floor for chamber 10. The head 17 of the connecting rod projects into chamber 10 through a central opening in partition 13 and in operation it oscillates conventionally about the axis of the wrist pin as its center. The lateral peripheral walls 18 and 19 of the connecting rod head 17 extend across the piston chamber parallel to the wrist pin axis and are curved about said axis as a center line. Walls 18 and 19 are spaced from the piston skirt 12 so that chamber 10 extends downwardly on both sides of the rod head 17 to form a pair of wells defined at their bottom by the segment portions of partition 13. Formed on partition 13 adjacent the curved walls 18 and 19 are upwardly projecting flanges 21 and 22. The inner faces 23 of these flanges are curved to correspond to the curvature of walls 18 and 19 and they are spaced slightly from such walls so that friction between the flanges and the oscillating rod head is prevented.

Cooling oil from the engine lubricating system is supplied under pressure to chamber 10 by means of a passage 24 which extends upward through the rod from the crankshaft (not shown) to join a circular passage 25 around the wrist pin which in turn is connected to a passage 26 and outlet 27 into said chamber. Since the cooling oil is supplied under the pressure of the lubricating oil system, it is projected from outlet 27 into chamber 10 and against the top and side walls of the piston. Extending upward from partition 13 are a pair of bosses 28 having drain ports 29 therethrough to permit the overflow of oil from the chamber back to the crankcase.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. In a piston and connecting rod assembly for an internal combustion engine of the class in which coolant is supplied through the connecting rod to the interior of the piston, in combination, a hollow piston having opposed bosses projecting inwardly from its skirt, a partition extending to the skirt of the piston to define a chamber therein for the reception of coolant, a connecting rod having a portion which extends through the partition into the chamber, means on the partition to form a substantial seal between the partition and connecting rod portion thus to confine coolant in the chamber, a wrist pin supported by the bosses to connect the rod to the piston, and means to permit the draining of coolant from the piston chamber.

2. In a piston and connecting rod assembly for an internal combustion engine of the class in which coolant is supplied through the connecting rod to the interior of the piston, in combination, a hollow piston having opposed bosses projecting inwardly from its skirt, an interior cooling chamber in the upper portion of the piston, a transverse partition extending to the piston skirt to define the lower end of said chamber, a connecting rod extending through the partition into the chamber, a wrist pin supported by the bosses to connect the rod to the piston, sealing means on the rod cooperating with the partition to substantially close off the chamber, and ports to drain the coolant from the chamber.

3. In a piston and connecting rod assembly for an internal combustion engine of the class in which coolant is supplied through the connecting rod to the interior of the piston, in combination, a connecting rod, a hollow piston having opposed bosses projecting inwardly from its skirt, a wrist pin supported by the bosses to connect the rod to the piston, an interior cooling chamber in the upper portion of the piston, a transverse partition extending to the piston skirt defining the bottom of the chamber, the top portion of the connecting rod extending through the partition into the chamber, sealing means on the partition extending alongside the top portion of the rod to substantially close the chamber, and coolant controlling ports in the chamber to maintain a minimum level of coolant in the chamber.

4. In a piston and connecting rod assembly for an internal combustion engine of the class in which coolant is supplied through the connecting rod to the interior of the piston, in combination, a hollow piston having opposed opposed bosses projecting inwardly from its skirt, an interior cooling chamber in the upper portion of the piston, a transverse partition extending across the piston to the skirt and having an opening therethrough, a connecting rod the top portion of which extends through the opening in said partition into the chamber, a pair of flanges extending upwardly from the partition on opposite sides of the top portion of the rod and adjacent to the rod to close off the chamber, a wrist pin supported by the bosses to connect the rod to the piston, and coolant controlling ports in the chamber to maintain a minimum level of coolant in the chamber.

5. In a piston and connecting rod assembly for an internal combustion engine of the class in which coolant is supplied through the connecting rod to the interior of the piston, in combination, a hollow piston having opposed bosses projecting inwardly from its skirt, an interior cooling chamber in the upper portion of the piston, a transverse partition extending across the interior of the piston to the skirt and having an opening therethrough, sealing flanges on the partition adjacent said opening, a connecting rod the top of which extends through the partition opening, said connecting rod and sealing flanges substantially sealing the chamber, a wrist pin supported by the bosses to connect the rod to the piston, and coolant controlling ports in the chamber to maintain a minimum level of coolant therein.

6. In a piston and connecting rod assembly for an internal combustion engine of the class in which coolant is supplied through the connecting rod to the interior of the piston, in combination, a connecting rod, a hollow piston having opposed bosses projecting inwardly from its skirt, a wrist pin supported by the bosses to connect the rod to the piston, an interior cooling chamber in the upper portion of the piston, a transverse partition extending across the interior of the piston to the skirt and having an opening therethrough, sealing flanges on opposite sides of the opening disposed transversely to the plane of oscillation of the connecting rod, the top of said connecting rod extending through the opening into the piston chamber in a sliding fit with said sealing flanges thus substantially sealing the chamber, and coolant controlling ports in the partition to maintain a minimum level of coolant in the chamber.

References Cited in the file of this patent

UNITED STATES PATENTS

| | | |
|---|---|---|
| 878,783 | Downie | Feb. 11, 1908 |
| 1,669,290 | Czock | May 8, 1928 |
| 1,763,625 | Mellor | June 10, 1930 |
| 2,236,401 | Gehres | Mar. 25, 1941 |

FOREIGN PATENTS

| | | |
|---|---|---|
| 742,696 | Germany | Dec. 9, 1943 |
| 952,208 | France | Apr. 25, 1949 |